Inventors
Tadeusz Zaba
Frits Weehuizen

United States Patent Office

3,325,994
Patented June 20, 1967

3,325,994
APPARATUS FOR REGULATING FUEL AND MO-
TIVE FLUID FLOW IN A GAS TURBINE ENGINE
Tadeusz Zaba and Frits Weehuizen, Wettingen, Aargau,
 Switzerland, assignors to Aktiengesellschaft Brown,
 Boveri & Cie, Baden, Switzerland, a joint-stock com-
 pany
Filed Dec. 9, 1965, Ser. No. 512,700
Claims priority, application Switzerland, Dec. 11, 1964,
16,061/64
6 Claims. (Cl. 60—39.25)

The present invention relates to an improved method and apparatus for regulating a gas turbine plant with at least one air-compressor, one heater, more particularly a combustion chamber with a fuel-regulator valve displaceable by setting means, and one turbine, the air-compressor and the turbine being equipped with blades displaceable by setting means.

It is known to provide air-compressors or turbines with displaceable impeller or rotor blades. Displacing the blades enables the aspirated volume to be varied at a constant speed in the case of air-compressors, and on the contrary the absorption capacity to be varied while preserving the highest possible efficiency in the case of turbines.

The object of the invention is to make gas-turbine plants of this kind more economical on operation by further increasing the part-load efficiency while at the same time attaining optimum quality of regulation. An attempt is also made to increase the working range of the plant without involving the need to increase the maximum gas temperature or the pressure at the inlet to the turbine.

The method according to the invention is characterized in that the opening of the fuel-regulator valve and the settings of the blades in the air-compressor and in the turbine are so associated with one another over part of the working range that with a variable load on the plant the gas temperature before the turbine remains constant.

The characteristic feature of the apparatus for carrying out the method resides in that the setting means for the fuel-regulator valve and the setting means for the blades in the air-compressor and in the turbine are linked to one another over the predetermined part of the working range by a ratio-regulator, so that when the load varies, the fuel-regulator valve and the compressor and turbine blades are displaced simultaneously in the same direction, and in that a temperature-regulator connected to the gas pipe between the combustion chamber and the turbine acts on the ratio-regulator in such a manner that the ratio of the change in blade settings to the change in the opening of the fuel-regulator valve is altered, as the gas temperature before the turbine rises, in such a direction as to reduce the fuel-air ratio.

The method and the regulator apparatus according to the invention may also be used with gas turbine plants in which the air-compressor and/or the turbine are built up from a plurality of part-compressors and part-turbines, or with plants comprising air pre-heaters or exhaust-heat boilers. Because the principle of regulation remains unaltered in all these cases of use, merely the collective terms "compressor" and "turbine" are employed in the following description.

An exemplary embodiment of the invention is more precisely explained hereinafter with reference to the accompanying drawings wherein.

Figure 1:
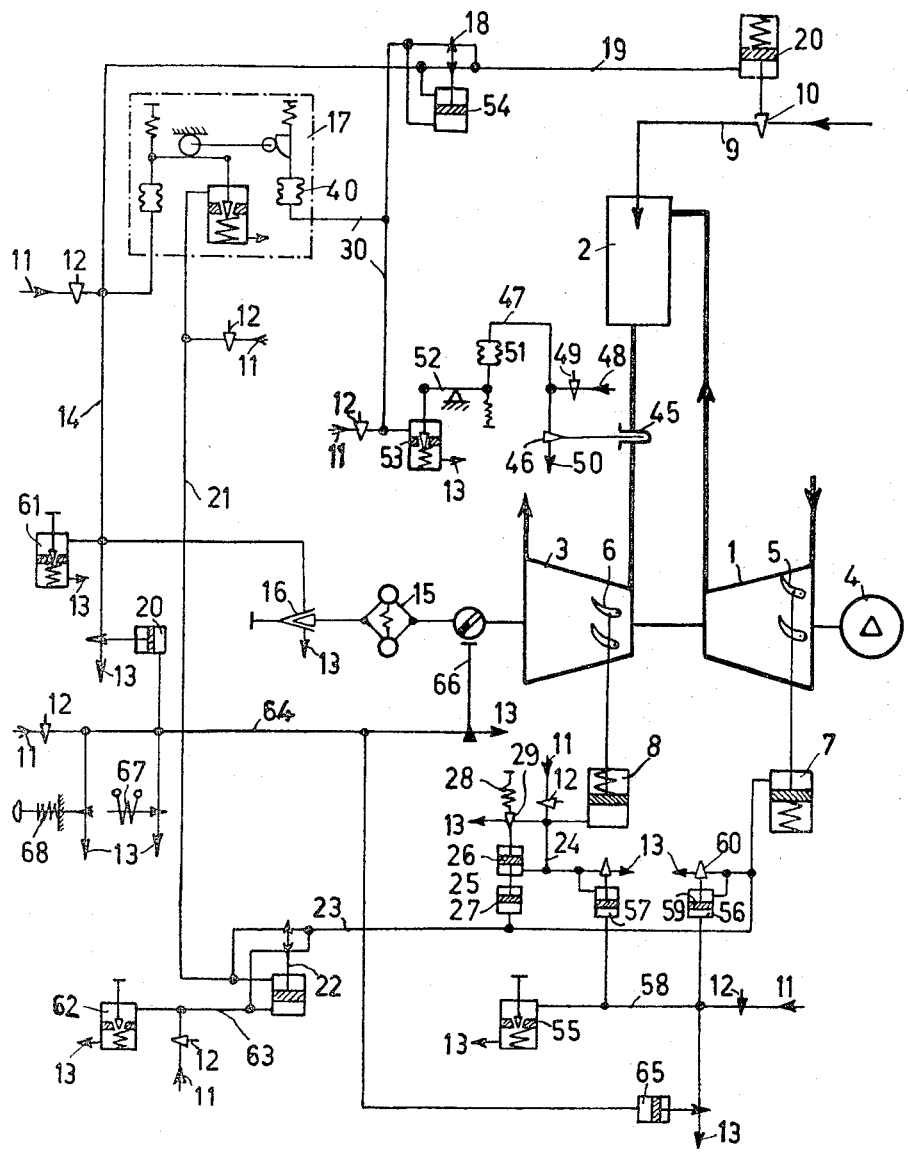
FIGURE 1 shows in schematic form a regulating apparatus for a simple gas turbine plant in accordance with the inventive concept.

The gas turbine plant diagrammatically illustrated in FIGURE 1 comprises an air-compressor 1, a combustion chamber 2 and a turbine 3. The turbine 3 drives the air-compressor 1 and a load in the form of an electrical generator 4. The air-compressor 1 and the turbine 3 are provided with displaceable impeller blades 5 and 6, respectively in order to improve the part-load efficiency. The impeller blades 5 and 6 are respectively displaced by servo-motors 7 and 8 controlled by oil under pressure. A fuel-regulator valve 10 controlled by oil under pressure is arranged in a fuel-feed pipe 9 to the combustion chamber 2.

The regulator device comprises a series of oil-pressure systems to which oil under pressure is fed at the points 11, via throttle-valves 12, from a common system under constant pressure, and from which systems the oil under pressure can flow away, i.e. is controllably bled off to the low pressure return point of the oil circulating system.

The pressure in the system 14 provides a measure of the load on the plant. An outlet valve 16 controlled by a centrifugal regulator 15 located on the turbine shafting regulates the oil pressure in this system 14. When the speed of the turbine increases, i.e. when the load decreases, the weights of the centrifugal regulator 15 move outwards under the influence of centrifugal force, and open the outlet valve 16. This results in a drop in pressure in the system 14. Conversely, when the turbine speed drops, i.e. when the load increases, the pressure in the system 14 rises. The pressure system 14 is linked to another pressure system 19 on the one hand via a ratio-regulator 17 and on the other hand via a three-way selector relay 18.

The pressure in the system 19 determines the opening of the fuel-regulator valve 10. The fuel-regulator valve 10 is displaced by a spring-loaded piston 20 acted on by oil under pressure in the system 19. When the pressure in the system 19 rises, the piston 20 moves against the force of the spring, with the result that the fuel-regulator valve 10 is opened. The valve is so adjusted that the fuel throughout alters approximately in proportion to the pressure in the system 19.

The pressure in another system 21 is kept at a predetermined ratio to the pressure in the system 14 by the ratio-regulator 17, in a manner described later. The system 21 is linked to a system 23 via a three-way selector relay 22.

The pressure in the system 23 determines the setting of the impeller blades 5 and 6 in the air-compressor 1 and in the turbine 3 respectively. The servo-motor 7 for displacing the impeller blades 5 in the air-compressor 1 is directly connected to the system 23. The impeller-blade displacement is so adjusted that the air throughput in the region of the nominal speed varies approximately in proportion to the pressure in the system 23. The turbine blades 6 are displaced indirectly, likewise under the influence of the pressure in the system 23. However, the servo-motor 8 is controlled by a system 24 which is linked to the system 23 via a reversing relay 25. This circuit has been chosen in order to be able to move the working point of the air-compressor 1 well away from the pumping limit as quickly as possible under special operating conditions, for example upon starting or the rapid final speed reduction, as is explained later in detail. The reversing relay 25 comprises two pistons 26 and 27 of equal surface area, rigidly linked to one another. The pressure in the system 23 acts on the piston 27, and the pressure in the system 24 on the piston 26. These two forces acting on the piston surfaces are in the same direction. Their resultant is taken up by a compression spring 28, which holds the piston system in balance. The piston system 26, 27 actuates a valve 29, which lets oil under pressure out of the system 24 back to the return 13. When the pressure in the system 23 rises, the piston system 26, 27 moves against the action of the spring 28, and opens the outlet valve 29. As a result, the pressure in the system 24 drops, and the valve 29 closes again. The piston system 26, 27 is again in balance. Conversely, the pressure in the system 24 rises in like measure to a drop in pressure in the system 23.

The pressure in the system 24 acts on the servomotor 8 for the purpose of displacing the turbine blades 6 in such a manner that the blades are opened when the pressure in the system 24 drops, i.e. when the pressure in the system 23 rises.

Figure 5:
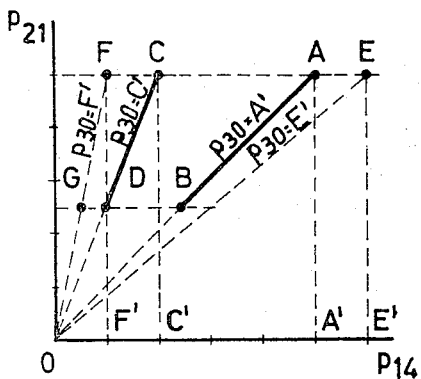

Without, for the time being, going any further into the function of the two three-way selector relays 18 and 22, let it be assumed that the systems 14 and 19 on the one hand and the systems 21 and 23 on the other hand are directly linked to one another. In this case, the pressures in the systems 14 and 19 are equal to one another. The fuel throughput thus varies in proportion to the pressure in the system 14. The pressures in the systems 21 and 23 are likewise equal to one another. The air throughput thus varies at a given speed in proportion to the pressure in the system 21. The pressure in the system 14 (abscissa in FIGURE 5) constitutes the input quantity and the pressure in the system 21 (ordinates in FIGURE 5) the output quantity of the ratio-regulator 17. The transmission ratio of this ratio-regulator 17 is a function of the pressure in the pressure system 30 of a temperature-regulator yet to be described. For a constant pressure in the system 30, the variation in pressure in the system 21 is proportional to the variation in pressure in the system 14 (FIGURE 5). This means that for a constant pressure in the system 30, the ratio of combustion-air throughput to fuel throughput is approximately constant, which corresponds to a substantially constant gas temperature before the turbine 3. The ratio of pressure variation in the system 21 to pressure variation in the system 14 is a function of the pressure in the system 30. Any variation in pressure in the system 30 thus results in a different ratio of combustion air and fuel, and thus a different gas temperature before the turbine.

Figure 2:
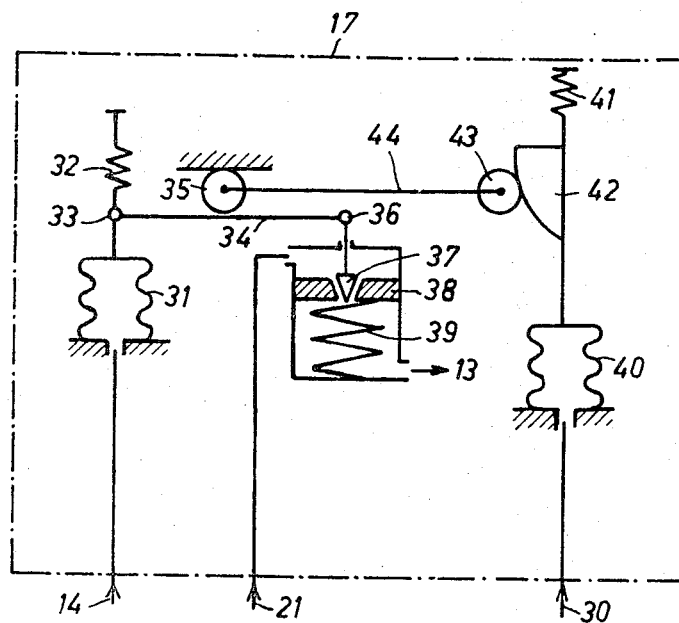
FIGURE 2 shows a detailed schematic of the ratio-regulator used in the regulator device of FIGURE 1.

FIGURE 2 shows in detail the construction of the ratio-regulator 17. The pressure in the system 14 acts on the surface of a bellows 31. The force thus set up is held in balance by a compresion spring 32 and the elastic forces of the bellows. The bellows 31 is linked via an articulation 33 to one end of a lever 34 which bears against a laterally displaceable roller 35. The other end of the said lever is linked via an articulation 36 to an outlet valve member 37. The opening of this outlet valve is disposed in a movable piston 38 acted on on the one hand by the pressure in the system 21 in the form of the output quantity of the ratio-regulator 17, and on the other hand by the opposing force of a spring 39. When the pressure in the system 14 increases, the spring 32 is compressed to a greater extent, with the consequence that the articulation 33 in FIGURE 2 is moved upwards. The lever 34 accordingly pivots in the clockwise direction about its point of contact with the roller 35, so that the articulation 36 moves downwards, and the valve dips more deeply into the piston 38. This reduces the amount of oil emerging from the system 21, and the pressure in the system 21 rises. The piston 38 moves downwards under the increasing pressure in the system 21, and compresses the spring 39 to a greater extent. This movement is continued until balance again prevails between the forces exerted on the piston 38 by the pressure in the system 21 and the spring 39, in which condition the outlet between the valve 37 and the piston 38 is again partially opened. Compared to the starting condition, the relative position of the valve 37 to the piston 38 is practically unaltered. Since the stroke of the articulation 33 is proportional to the variation in pressure in the system 14, the stroke of the articulation 36 will also be proportional to this variation, but nevertheless in dependence on the position in any particular case of the roller 35 which forms the pivot point of the double-armed lever 34. The piston 38 accurately follows the movement of the valve 37, so that the stroke of this piston, and thus also the variation in pressure in the system 21, is proportional to the variation in pressure in the system 14.

The position of the roller 35 is controlled by the pressure in the system 30. This pressure acts on the surface of a bellows 30. The force thus set up, disregarding bellows forces, is held in balance by a compression spring 41. A cam 42, on which a roller 43 runs, is rigidly linked to the bellows 40. This roller 43 is linked via a rod 44 to the roller 35. When the pressure in the system 30 rises, the cam 42 in FIGURE 2 moves upwards. It is so shaped as to move the roller 35 to the right when this occurs. The above-mentioned ratio of the pressure variation in system 21 to the pressure variation in the system 14, i.e. the transmission ratio of the regulator 17, accordingly decreases with rising pressure in the system 30. It will be explained later from what viewpoints the transmission ratio is adjusted as a function of the pressure in the system 30.

The pressure in the system 30 determines the gas temperature prevailing before the turbine. This system is controlled by a temperature-regulator, upon which devolves the tasks of maintaining a predetermined temperature before the turbine over part of the working range of the plant, i.e. in that range comprising simultaneous fuel and blade displacement. This temperature-regulator is also intended to limit the maximum temperature under special operating conditions, for example on starting.

A regulator thermostat 45, which affects the pressure in a compressed-air system 47 via an outlet valve 46, is incorporated in the combustion gas line between the combustion chamber 2 and the turbine 3. The compressed air is introduced at the point 48 via a throttle-valve 49, and blows off at the point 50. The air pressure in the system 47 acts on a bellows 51 which co-operates with an outlet valve 53 via a double-armed lever 52 in a similar manner to the bellows 31 in the ratio-regulator 17, and the valve 53 regulates the pressure in the oil-pressure system 30.

As has been mentioned, the pressure in the system 30 determines the transmission ratio of the ratio-regulator 17, which in turn determines the fuel-air ratio and thus the gas temperature before the turbine.

As well as being linked to the ratio-regulator 17, the system 30 is also linked via the three-way selector relay 18 to the system 19 for the purpose of controlling the fuel-regulator valve 10. In accordance with the earlier assumption, however, let the three-way selector relay 18 be in a setting in which the system 14 is directly linked to the system 19, while the system 30 does not affect the system 19.

With this proviso, the temperature-regulator works as follows: As the gas temperature before the turbine rises, the outlet valve 46 is displaced in the direction of closure by the regulator thermostat 45, with the result that the air pressure in the system 47 rises. The increasing pressure in the bellows 51 causes the outlet valve 55 to open, and the pressure in the system 30 thus to be reduced. In consequence of this reduction in pressure in the system 30, the ratio-regulator 17 alters the ratio of the pressures in the systems 14 and 21 in the sense of a reduction in the fuel-air ratio. If the effective output of the gas turbine remains the same, i.e. if the pressure in the system 14 remains constant, this means that the pressure in the system 21 rises, so that the blades 5 and 6 are opened. The reduction in the fuel-air ratio opposes the aforementioned increase in temperature.

The method of operation of that part of the regulator device already described, and designed in the spirit of the invention, is explained hereinafter with reference to FIGURES 3 to 6.

Figure 3:
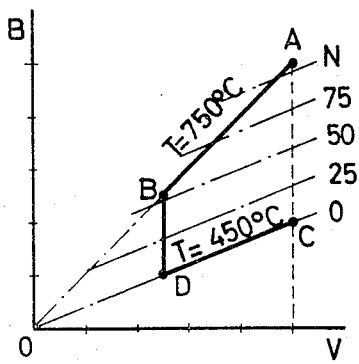
FIGURES 3 to 6 show curves for the purpose of explaining the manner of operation of the regulator device and the regulated gas turbine plant of FIGURES 1 and 2.

The diagram in FIGURE 3 illustrates the dependence of fuel throughput B on air throughput V with a variable effective output N from the turbine. The lines of constant effective output are shown in dash-dotted form. The approximate working range of the plant described may also be seen from this diagram. It is clear from this that simultaneous variation of the fuel and air throughputs can keep the gas temperature T before the turbine constant over a wide working range. For example, the effective output can be reduced to approximately 60% of the nominal output while maintaining a gas temperature of 750° C., as shown by the AB of the characteristic line. As the load continues to be reduced, in which case the working point moves from B to D, the blades remain in the setting of minimum opening (below approximately 60% nominal load) so that the fuel air ratio becomes lower and lower, until under no-load conditions (point D) it reaches substantially the no-load ratio without blade-displacement (point C). The diagram in FIGURE 3 reveals at once that the part-load or no-load fuel consumption, as shown by the straight lines ABD, is considerably less than when operating with a fixed blade setting, corresponding to moving the working point from A to C.

Figure 4:
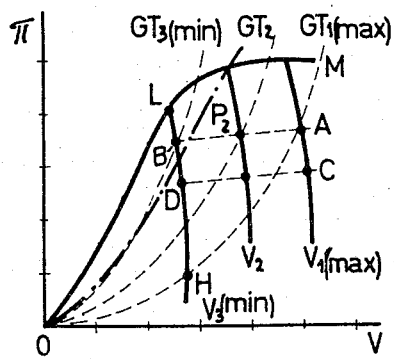

The same operating points A, B, C and D are also plotted in the $\pi$–V diagram of the air-compressor in FIGURE 4, which diagram portrays the pressure ratio $\pi$ as a function of the air throughput V for three different constant settings (V1, V2 and V3) of the compressor blades. This presupposes that the compressor speed and the air-aspiration temperature are constant. It follows from the steepness of the $\pi$–V curves that the air throughput at a given speed depends almost entirely on the compressor-blade setting, and only to a very slight extent on the pressure ratio.

Three resistance lines GT1, GT2 and GT3 of the gas turbine are also shown in FIGURE 4, in dashed form. In this connection, a constant gas temperature before the turbine 3 is presupposed, in the present case 750° C. The working points A and B of FIGURE 3 appear in the diagram of FIGURE 4 as points of intersection of the curves V1 and GT1, and V3 and GT3. If the gas temperature is lower than, for example, 740° C., the resistance lines of the gas turbine for the same blade setting are lower than those shown. The points of intersection with the $\pi$–V curves of the air-compressor are then different, for example C and D for a gas temperature of 450° C.

The operating point H, which results when the compressor blades are open to a minimum and the turbine blades are open to a maximum, offers maximum security against pumping by the air-compressor, which will be discussed later.

The diagram of FIGURE 5 shows the blade opening as a function of effective output and the progressive variation of the pressure $p_{21}$ in the system 21 in dependence on pressure $p_{14}$ in the system 14 for four different transmission ratios of the ratio-regulator 17 and four different pressure $p_{30}$ in the system 30.

The characteristic lines OGF and OE are the two limiting lines of the ratio-regulator 17, the former corresponding to a minimum fuel-air ratio, i.e. a minimum gas temperature before the turbine, and the latter to a maximum fuel-air ratio (i.e. a maxiumum gas temperature before the turbine. The characteristic lines ODC and OBA relate to the identically designated characteristic lines in FIGURE 3, and are valid for fuel-air ratios corresponding to a gas temperature before the turbine of 450° C. and 750° C. The fact that they extend in the form of straight lines reveals that there is a direct proportion between the quantities of fuel and air for a constant pressure in the system 30.

For example, if the pressure in the system 30 corresponds to a gas temperature of 750° C., the working point will move along the characteristic line OBA from A to B as the effective output drops, i.e., as the pressure in the system 14 drops. In accordance with FIGURE 3, the point B corresponds to a part-load of approximately 60% of the rated output. In this operational condition, the blades 5 and 6 are in their setting of minimum opening. They remain in this setting upon further reduction in the load, i.e. upon a continued reduction in the pressure in the system 14. The mutually identical pressures in the systems 21 and 23 are certainly reduced even further, but this can no longer have any effect on the blade setting.

Figure 6:
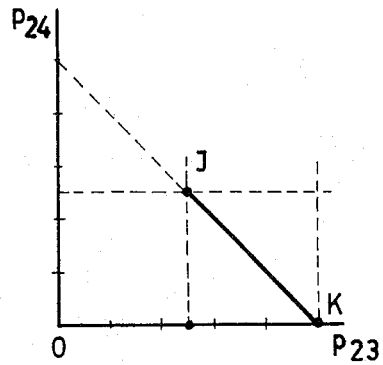

The setting of the reversing relay 25 is apparent from the diagram of FIGURE 6, wherein the degree of closure of the turbine blades 6 (pressure in the system 24) is illustrated in dependence on the degree of opening of the compressor blades 5 (pressure in the system 23). In this connection, the point J on the diagram indicates the position for minimum opening of the compressor and turbine blades, and K the position for maximum opening of the blades.

The settings of the fuel-regulator valve 10 and of the compressor and turbine blades 5 and 6 are so associated with one another that on the one hand the desired gas temperature before the turbine (for example 750° C.) is maintained, and on the other hand the optimum pressure ratio as regards efficiency for the particular gas temperature in use is produced over the range of displacement (working points A and B in FIGURE 4). As is further explained in the following paragraph with reference to an example, the regulator device being described has the function of displacing the fuel-regulator valve 10 and the compressor and turbine blades 5 and 6 simultaneously in the same direction when the load varies, so that the temperature-regulator connected to the gas pipe before the turbine 3 has to take only a slight corrective action on the regulator in order to keep the gas temperature at the prescribed required value. This gives optimum quality of regulation.

The set will be assumed to be in a stationary operating condition, the gas temperature before the turbine being, for example 750° C. The working point lies somewhere on the characteristic line AB if the impeller blades 5 and 6 are at least partly open. The pressure in the oil-pressure system 30 of the temperature-regulator is then of such a value that the ratio-regulator 17 follows the characteristic line OBA. If, for example, there is now an increase in load, the pressure in the system 14 increases under the influence of the centrifugal regulator 15. The pressure in the system 21, being the output quantity of the ratio-regulator 17, follows the pressure in the system 14, which constitutes the input quantity, in accordance with the characteristic line OBA, as long as the control pressure in the system 30 does not vary. When the working point moves along the line AB, however, the fuel-air ratio and accordingly the gas temperature will vary only slightly, because the line AB—apart from small variations—represents a line of constant gas temperature on the basis of the chosen settings. This means that in order to maintain the required temperature, the temperature-regulator only has to compensate for the effect of these small variations by a slight displacement of the characteristic line of the ratio-regulator 17.

When the effective output drops, i.e. when the pressure in the system 14 drops, the minimum opening of the impeller blades is reached at a certain instant, this being the case at a gas temperature of 750° C. and at the working point B (FIGURES 3 and 5). If there is a continued reduction in output, the impeller blades 5 and 6 remain at this minimum setting. The fuel-air ratio is henceforth reduced, and the gas temperature drops below the required value of the temperature-regulator, which as a result drives the ratio-regulator 17 towards the least steep limiting line OE. The effective output of the plant is now determined only by the setting of the fuel-regulator valve 10.

When the effective output increases, i.e. when the pressure in the system 14 increases (abscissa, FIGURE 5), the maximum opening of the impeller blades is reached at a certain instant, for example at a gas temperature of 750° C. and at the working point A (FIGURES 3 and 5). Should the gas temperature before the turbine now rise for any reason, the temperature-regulator would be incapable of countering this rise in temperature by changing the characteristic line of the ratio-regulator 17 in such a direction as to increase the blade-openings. With the blades opened to their maximum extent, the impermissible rise in temperature can be compensated for only by closing the fuel-regulator valve 10, i.e. by reducing the pressure in the system 19. In this operational condition, the temperature-regulator 45 takes over control of the fuel-regulator valve 10 instead of the speed-regulator 15. The speed-regulator is thus over-driven by the temperature-regulator, which means that the frequency in the mains supplied by the generator 4 must be maintained by other sets connected in parallel. The change-over from one method of operation to the other is carried out by the three-way selector relay 18.

In order to connect the system 30 to the system 19 in shock-free fashion when the maximum blade-opening is reached, the inclination of the characteristic line as a function of the pressure in the system 30 is set up in the ratio-regulator 17 with the aid of the cam 42, in the manner indicated in FIGURE 5. Along the line OA, the pressure in the system 30 is equal to the pressure in the system 14 at the working point A (value A' in FIGURE 5), along the line OC equal to the pressure in the system 14 at the working point C (value C') etc. At all points on the line FCAF, the pressure in the system 30 is thus equal to that in the system 14.

The three-way selector relay 18 links the systems 30 and 19 to one another when the blades are under full control. The pressures in the two systems 14 and 30 act on two mutually opposing surfaces of equal magnitude on a piston 54, which is rigidly linked to a two-way valve. If, for example, the pressure in the system 14 is less than that in the system 30, an upwardly directed resultant force is exerted on the piston 54 in FIGURE 1. The three-way valve is consequently in the upper setting, in which the systems 14 and 19 are linked to one another. As soon as an alteration in the pressure in the system 30 makes it less than the pressure in the system 14, the three-way valve changes over and links the systems 30 and 19 to one another.

As long as the blades have not reached their maximum opening, and the pressure in the system 21 thus does not assume the value corresponding to the line FCAE in FIGURE 5, the pressure in system 14 is always less than the pressure in the system 30 on the basis of the relationship defined above between the angle of inclination of the characteristic line and the pressure in the system 30, i.e. the systems 14 and 19 are directly linked to one another. However, if the temperature regulator causes the characteristic line in FIGURE 5 to pivot in the anti-clockwise direction for the purpose of compensating for a rise in temperature after a working point on the line FCAE has been reached, the pressure in the system 30 drops below that in the system 14, which means that the systems 30 and 19 are linked to one another, so that the temperature-regulator can now act directly on the fuel-regulator valve 10. Since the changeover then always takes place when the pressures in the systems 30 and 14 are of equal magnitude, no pressure shocks occur. After the change-over the working point remains on the line FCAE; the speed-regulator has lost its effect.

To sum up, it may be said that when the temperature before the turbine is too high the temperature-regulator can always over-ride the instruction of the speed-regulator in the load-shedding direction. Conversely, the speed-regulator also can always over-ride the temperature-regulator in the load-shedding direction when there is a reduction in the load.

The mechanical link between the impeller blades 6 of the turbine 3 and the associated servo-motor 8 is preferably so designed that no displacement is imparted to the impeller blades 6 when there are small variations in load such as are produced for example by the continuously occurring small variations in mains frequency, in order to avoid continually moving the blades to and fro and the accompanying wear on the setting members. The said mechanical link may exhibit some backlash for this purpose.

When the set is being started, the compressor blades 5 should be at the setting of minimum opening in order to prevent the air-compressor 1 from pumping, because at this setting the pumping limit of the air-compressor is furthest from its working point (FIGURE 4). In the case of the diagram of FIGURE 4, care must be taken to see that the portion OL of the pumping limit represents the pumping limit associated with minimum opening of the impeller blades. This occurs when the speed is reduced while retaining the minimum opening of the impeller blades. A different blade-setting, for example that with the characteristic line V2 at nominal speed, has a pumping limit P2 illustrated in dash-dotted form in FIGURE 4 when the speed is varied. The remaining part LM of the pumping unit shown is thus to be interpreted as covering individual pumping limits.

If the opening of the turbine blades is increased while maintaining the minimum opening of the compressor blades 5, the working point of the air-compressor 1 moves away from the pumping limit. At nominal speed, with the turbine blades 6 opened to their maximum extent, and at a gas temperature 750° C., it is located for example at the point H (FIGURE 4).

In order to attain this method of operation, the reversing relay 25 and the oil-pressure system 24 already described are supplemented by a starting valve 55 and two static relays 56 and 57. In the present example, the starting valve 55 is a manually displaceable pressure-holding valve, with which any desired regulation pressure may be set up in the system 58. The two static relays 56 and 57 function in the same manner, which is accordingly explained below for the relay 56 only. The pressures in the two systems 58 and 23 act on two mutually opposing surfaces of equal magnitude on a piston 59. Oil under pressure can be let out of the system 23 via an outlet valve 60, which is rigidly linked to the piston 59. As long as the pressure in the system 58 is greater than that in the system 23, the outlet valve 60 is closed, and the system 58 has no effect on the pressure in the system 23. On the other hand, if the pressure in the system 58 drops below the value prescribed by the ratio-regulator 17 as a result of actuation of the starting valve 55, the outlet valve 60 is opened and the pressure in the system 23 is then reduced. The piston 59 comes into balance again only when the pressures in the systems 23 and 58 have compensated for one another. Dropping the pressure in the system 58 thus makes it possible to over-ride the ratito-regulator 17 in the direction of reducing the pressure in the system 23, and to over-ride the reversing relay 25 in the direction of reducing the pressure in the system 24.

A drop in pressure in the system 58 by means of the starting valve 55 thus results in closure of the compressor blades 5 and opening of the turbine blades 6. When there is no pressure at all in the system 58, the compressor blades 5 are in the minimum setting, but the turbine blades on the other hand are fully opened (point O in FIGURE 6.)

It would be conceivable upon starting that the now very low pressure ratio would prevent the gas turbine 3 from accelerating the set up to nominal speed. Closing the starting valve 55, with a consequent rise in pressure in the system 58 enables the turbine blades 6 to be progressively closed. The compressor blades 5 then remain at the minimum setting until the condition in which all the blades are at the minimum setting is reached (point J in FIGURE 6). It is thus possible to adapt the pressure ratio to the requirements of the starting procedure. This circuit also makes it impossible to close the turbine blades 6 more than the compressor blades 5—which in fact remain at the minimum setting—which closeure could cause the air-compressor to pump.

The pressure in the system 14 upon starting can be adjusted by the starting valve 61, which functions in a similar manner to the starting valve 55.

It has so far been assumed that the systems 21 and 23 are directly linked to one another. However, provision is made for the possibility of adjusting the impeller blades 5 and 6 manually, i.e. interrupting automatic displacement by the ratio-regulator 17. It may, for example, be desired to make a fixed adjustment to the blades in cases of operation involving large fluctuations in load, in order not to imposed excessive stress on the displacement mechanism. A starting valve 62 and the three-way selector relay 22 are provided for this purpose. The starting valve 62 can set up any desired pressure in a system 63 which can be connected via the selector relay 22 to the system 23. The three-way selector relay 22 functions in a similar manner to the selector relay 18, the arrangement being such that of the two systems 21 and 63, the one at higher pressure is always linked via the selector relay 22 to the system 23.

The ratio-regulator 17 determines the pressure in the system 21 and thus the setting of the impeller blades 5 and 6, as long as the pressure in the system 21 is greater than the pressure set up by the starting valve 62 in the system 63. As soon as the pressure in the system 63 exceeds that in the system 21, the system 23 assumes the pressure in the system 63. Any constant blade-opening greater than that required by the ratio-regulator 17 may thereupon be manually set by the starting valve 62. A blade opening smaller than that prescribed by the ratio-regulator 17 cannot be set up in this manner.

The safety system of the plant being described is illustrated in FIGURE 1 in simplified fashion only. It is sufficient here to state, that in the case of a rapid shut-off a drop in pressure in a further oil-pressure system 64 removes pressure from the speed-regulator system 14 and the auxiliary system 58 via safety relays 20 and 65. As a result, the working point moves as far as possible away from the pumping limit of the air-compressor (point H in FIGURE 4). Pressure can be removed from the system 64 by various members, for example by an excess-speed contactor 66 or by a magnetic valve 67, or finally by a manual valve 68.

We claim:

1. In a gas turbine power plant the combination comprising an air compressor having adjustable blading and means for adjusting said blading, a gas turbine having adjustable blading and means for adjusting said blading, said turbine being connected to said compressor by shafting for driving said compressor and also a load such as an electric generator, a combustion chamber intermediate said compressor and turbine for receiving compressed air from said compressor and delivering combustion products to said turbine through a conduit connection, a fuel line supplying fuel to said combustion chamber, a control valve in said fuel line, means for regulating said fuel control valve, a temperature regulator in said conduit connecting said combustion chamber with said turbine, and a ratio regulator interconecting said means for adjusting the blading on said compressor and turbine and said regulating means for said fuel control valve, said ratio regulator operating in the middle and upper ranges of load on said power plant such that upon a change in load, said fuel control valve and the blading of said compressor and turbine are displaced simultaneously in the same direction to maintain a substantially constant combustion gas temperature in advance of said turbine, and means for over-riding and modifying the operation of said ratio regulator by said temperature regulator such that for a change in load in the lower load range the ratio of the change in the adjustment of the blading of said compressor and turbine to the change in opening of said fuel control valve is altered as the combustion gas temperature in advance of said turbine rises thereby reducing the fuel-air ratio and reducing said combustion gas temperature.

2. A gas turbine power plant as defined in claim 1 wherein the settings of the respective bladings in said compressor and turbine have an inter-relation such that the ratio of the end pressure of said compressor in the operating point to the associated end pressure at the pumping limit remains at least substantially constant.

3. A gas turbine power plant as defined in claim 1 wherein the respective means for adjusting the bladings of said compressor and turbine and said means for regulating said fuel control valve have an operating inter-relation such that said bladings of said compressor and turbine are not further displaced when the load on said power plant falls below approximately 60% of its rated output.

4. A gas turbine power plant as defined in claim 1 and which further includes manually displaceable means for fixing the respective positions of the bladings of said compressor and turbine during operation of the plant.

5. A gas turbine power plant as defined in claim 1 and which further includes means linking said fuel control valve to said temperature regulator in a shock-free manner when a predetermined air throughput point is reached.

6. A gas turbine power plant as defined in claim 1 and which further includes means for starting and for rapidly shutting off said plant and which enable the blading of said compressor to be brought to the maximum closed position and the blading of said turbine to be brought to the maximum open position.

References Cited

UNITED STATES PATENTS 3,025,668   3/1962   Mock _____ 60—39.24

JULIUS E. WEST, *Primary Examiner.*